(12) United States Patent
Dwivedi et al.

(10) Patent No.: US 12,723,146 B2
(45) Date of Patent: Sep. 1, 2026

(54) METHOD FOR PREPARING A SILICA EMBEDDED CARBON BLACK COMPOSITE AGGREGATE AND COMPOSITE AGGREGATE PREPARED THEREBY

(71) Applicant: APOLLO TYRES LTD., Tamil Nadu (IN)

(72) Inventors: Chandresh Dwivedi, Maharashtra (IN); Tapas Ranjan Mohanty, Odisha (IN); Ramakrishnan S., Tamilnadu (IN); Jiby Isaac, Tamilnadu (IN); P K Mohamed, Kerala (IN); Sampatrao Dagu Manjare, Maharashtra (IN)

(73) Assignee: APOLLO TYRES LTD., Tamil Nadu (IN)

( * ) Notice: Subject to any disclaimer, the term of this patent is extended or adjusted under 35 U.S.C. 154(b) by 1130 days.

(21) Appl. No.: 17/705,892

(22) Filed: Mar. 28, 2022

(65) Prior Publication Data

US 2022/0306839 A1 Sep. 29, 2022

(30) Foreign Application Priority Data

Mar. 26, 2021 (IN) ............................ 202141013508

(51) Int. Cl.
*C08K 9/06* (2006.01)
*C08K 3/013* (2018.01)
(Continued)

(52) U.S. Cl.
CPC ................ *C08K 9/06* (2013.01); *C08K 3/013* (2018.01); *C08K 3/04* (2013.01); *C08K 3/36* (2013.01);
(Continued)

(58) Field of Classification Search
None
See application file for complete search history.

(56) References Cited

U.S. PATENT DOCUMENTS 5,830,930 A 11/1998 Mahmud et al.
5,904,762 A * 5/1999 Mahmud ................. C08K 9/06 423/337
(Continued)

FOREIGN PATENT DOCUMENTS

EP 1122212 A2 8/2001
WO 2016176237 A1 11/2016
WO 2016176237 A9 8/2017

OTHER PUBLICATIONS

Extended European Search Report for corresponding Application No. EP 22 16 4516, issued Sep. 1, 2022.
(Continued)

*Primary Examiner* — Amber R Orlando
*Assistant Examiner* — Ryan Patrick Loughran
(74) *Attorney, Agent, or Firm* — RENNER, OTTO, BOISSELLE & SKLAR, LLP

(57) ABSTRACT

The disclosure relates to a silica embedded carbon black composite aggregate prepared by a method comprising: a) feeding an oxidative gas, silica precursor and carbon black feedstock to a mixing chamber of a reactor assembly; b) mixing the oxidative gas, silica precursor and carbon black feedstock in the mixing chamber to obtain a pre-mixed blended feedstock; c) injecting the pre-mixed blended feedstock into a flame burner of the reactor assembly, the flame burner being operably connected to the mixing chamber; d) generating heat of combustion through partial oxidative burning of the pre-mixed blended feedstock to attain reactor thermal conditions; and e) cracking the pre-mixed blended feedstock to produce in-situ formed silica embedded carbon black composite aggregate, wherein weight percent of the embedded silica particle in the composite aggregate is in a range of from about 30% to about 60%.

19 Claims, 12 Drawing Sheets

(51) Int. Cl.
*C08K 3/04* (2006.01)
*C08K 3/36* (2006.01)

(52) U.S. Cl.
CPC .. *C08K 2201/006* (2013.01); *C08K 2201/014* (2013.01)

(56) References Cited

U.S. PATENT DOCUMENTS

| | | | |
|---|---|---|---|
| 6,020,402 | A | 2/2000 | Anand et al. |
| 6,057,387 | A | 5/2000 | Mahmud et al. |

OTHER PUBLICATIONS

Spicer, et al. "Flame Synthesis of Composite Carbon Black-Fumed Silica Nanostructured Particles" Journal of Aersol Science, Elmsford NY. vol. 29, No. 5/06. Jun. 1, 1998. pp. 647-659.

Kammler, et al. "Synthesis of Silica-Carbon Particles in a Turbulent H2-Air Flame Aersol Reactor" Aiche Jounral, John Wiley & Sons, Inc. vol. 47, No. 7, 16. Apr. 2004. pp. 1533-1543.

* cited by examiner eZAF Smart Quant Results

| Element | Weight % | Atomic % | Net Int. | Error % | Kratio | Z | A | F |
|---|---|---|---|---|---|---|---|---|
| C K | 89.2 | 92.0 | 111.9 | 3.3 | 0.8109 | 1.0071 | 0.9025 | 1.0000 |
| O K | 9.8 | 7.5 | 4.5 | 21.7 | 0.0276 | 0.9497 | 0.2977 | 1.0000 |
| SiK | 1.0 | 0.5 | 1.1 | 46.5 | 0.0036 | 0.8401 | 0.9796 | 1.0061 |

eZAF Smart Quant Results

| Element | Weight % | Atomic % | Net Int. | Error % | Kratio | Z | A | F |
| --- | --- | --- | --- | --- | --- | --- | --- | --- |
| C K | 81.2 | 87.2 | 73.2 | 7.3 | 0.5277 | 1.0200 | 0.8429 | 1.0000 |
| O K | 10.8 | 8.8 | 5.1 | 31.0 | 0.0322 | 0.9623 | 0.3104 | 1.0000 |
| Si K | 8.0 | 4.0 | 9.0 | 0.3 | 0.0733 | 0.9517 | 0.9791 | 1.0023 |

| Element | Weight % | Atomic % | Net Int. | Error % | Kratio | Z | A | F |
|---|---|---|---|---|---|---|---|---|
| C K | 73.4 | 64.9 | 54.0 | 8.1 | 0.2701 | 1.0419 | 0.4764 | 1.0000 |
| O K | 12.5 | 27.6 | 29.2 | 11.3 | 0.1208 | 0.9634 | 0.3908 | 1.0000 |
| Si K | 14.1 | 7.1 | 22.1 | 6.5 | 0.1236 | 0.8709 | 0.9622 | 1.0022 |

eZAF Smart Quant Results

| Element | Weight % | Atomic % | Net Int. | Error % | Kratio | Z | A | F |
|---|---|---|---|---|---|---|---|---|
| C K | 41.4 | 52.9 | 39.3 | 11.0 | 0.1693 | 1.0681 | 0.3726 | 1.0000 |
| O K | 35.6 | 35.1 | 47.2 | 10.7 | 0.1630 | 0.9651 | 0.4403 | 1.0000 |
| SiK | 22.9 | 12.0 | 40.3 | 5.7 | 0.1869 | 0.8863 | 0.9590 | 1.0016 |

METHOD FOR PREPARING A SILICA EMBEDDED CARBON BLACK COMPOSITE AGGREGATE AND COMPOSITE AGGREGATE PREPARED THEREBY

RELATED APPLICATION DATA

This application claims the benefit of Indian Patent Application No. 202141013508, filed Mar. 26, 2021, the disclosure of which is incorporated herein by reference in its entirety.

FIELD OF THE INVENTION

The present invention relates to a method for preparing a silica embedded carbon black composite aggregate and the silica embedded carbon black composite aggregate prepared thereby. The invention further relates to the use of the silica embedded carbon black composite aggregates in compositions such as rubber compositions.

BACKGROUND OF THE INVENTION

The reinforcement of elastomers by fillers such as carbon black and silica is fundamental to the rubber industry. The fillers are finely divided and typically submicron size particles. The filler materials are formulated into synthetic and natural rubber compounds used for a wide variety of rubber goods such as hoses, belts, gaskets, bushings, dynamic composite articles such as tyres and so on. The filler particles allow rubber compounds to be designed for substantial improvement in properties pertaining to respective applications. For instance, rubber compounded with a reinforcing carbon black filler shows dramatic improvement in wear resistance and thus becomes useful for conveyer belts, tire treads and other demanding service applications. Silica, which is a mineral filler, is another most common filler material that is generally used as such or in combination with carbon black in the natural or synthetic rubber products, especially those which are subjected to dynamic applications such as an automobile tire. The incorporation of silica filler into a rubber compound provides the rubber compound a good hysteresis balance at different temperatures. In a dynamic application, hysteresis is understood as the energy loss during the rubber compound's cyclic deformation. Silica also needs to be incorporated into the rubber formulations to attain various other properties such as durability and flexibility of the rubber compounds.

It is vital to have a combination of reinforcing fillers selected from carbon black and mineral fillers like silica to achieve desired dynamic application properties for tyres and other non-tyre products such as conveyor belts, engine mounts etc. This is the key reason why the rubber compounds are designed by incorporating both carbon black and silica in the formulations to have a better balance of performance properties. Automotive industry is one amongst the major consumers of carbon black and silica fillers as reinforcing fillers for achieving the desired technical and performance properties of tires and other rubber parts.

The existing and widely employed method of using both carbon black and silica filler materials in a rubber compound is by incorporating them separately in the rubber compound. The rubber-filler(s) interaction may be enhanced by using this and other conventional rubber compounding techniques. However, the rubber-filler interactions involve both physical and chemical interactions between the rubber and filler. In a manner, these interactions among the filler and polymer are accounted to their surface affinities. This sometimes causes filler localization in the rubber matrix. This creates filler-dispersion gradient in the elastomer matrices. So, the conventional way of separately incorporating fillers into the rubber compound does not address the homogeneity through blending various types of fillers which largely differ in chemistry and morphology.

Furthermore, the differences between surface energy of the fillers can lead to incompatibility between the fillers. This subsequently interferes in the rubber mixing processes and thus impacting filler-polymer interactions. So, incorporating chemically or morphologically different fillers individually, does not essentially yield a balanced dispersion or improvement in performance properties of the rubber compounds.

In order to address the problems associated with separately incorporating individual fillers such as silica and carbon black into rubber compounds, some techniques of forming a composite filler material containing one species of each filler material, i.e. carbon black and silica (mineral component), commonly referred to as a multi-phase or dual-phase filler, were disclosed in the prior art.

U.S. Pat. Nos. 6,020,402, 5,904,762, 5,830,930 and 6,057,387 disclose preparation of multiphase fillers comprising silica-treated carbon black using a multistage injection configuration in a modified furnace black reactor. The modified reactor has multiple entry points for both feedstock and precursors. This technique produces multiphase fillers which have an aggregate particle comprising a carbon black phase and a silicon-containing species phase that is claimed to be absorbed on carbon black surface. The method produces limited silica phase distribution in the carbon black aggregate.

When the multiphase filler produced using the multistage injection configuration in a furnace black reactor is incorporated into a rubber compound, the mechanical and performance properties of the rubber compounds may be improved but the formation of such filler in a multistage and multistep reactor configuration has an adverse impact on the feed to product conversion, efficiency of the process and distribution of silica phase in the carbon black aggregates.

The multistep or series of injection points for the precursor in the reactor leads to the formation of final filler material having higher degree of absorbed secondary phase that is silica material rather than a discrete aggregate. This limits the commercial viability of the processes known from the prior art for obtaining desired level of silica embedment in the carbon black aggregate.

Another limitation of the known processes is that the precursor required for the silica filler formation in the reactor should have very high volatility for instant conversion and absorption on the already formed carbon black aggregate. This limits the precursor selection options and makes the process extremely risky to perform due to highly volatile environments.

Yet another disadvantage is the formation of additional greenhouse gases during the production of the multiphase filler in a multistage reactor which remain as residual matter in the final product. This adversely affects the stability of the composite material.

Therefore, despite the advances made, there is a need in the art for improved methods for preparing a composite aggregate material comprising carbon black and silica.

SUMMARY OF THE INVENTION

To meet this objective, a novel method for preparing a silica embedded carbon black composite aggregate has been disclosed which overcomes the drawbacks of the existing methods.

The method of the invention facilitates in-situ synthesis of silica embedded carbon black composite aggregate through a single step injection of a pre-mixed blended feedstock.

The invention further discloses a silica embedded carbon black composite aggregate prepared by the method as disclosed herein.

Accordingly, in a first aspect, the present invention discloses a method for preparing a silica embedded carbon black composite aggregate comprising:

a) feeding an oxidative gas, silica precursor and carbon black feedstock to a mixing chamber of a reactor assembly;
b) mixing the oxidative gas, silica precursor and carbon black feedstock in the mixing chamber to obtain a pre-mixed blended feedstock;
c) injecting the pre-mixed blended feedstock into a flame burner of the reactor assembly, said flame burner being operably connected to the mixing chamber;
d) generating heat of combustion through partial oxidative burning of the pre-mixed blended feedstock to attain reactor thermal conditions; and
e) cracking the pre-mixed blended feedstock to produce in-situ formed silica embedded carbon black composite aggregate.

The carbon black feedstock and the silica precursor are fed into the mixing chamber in a ratio appropriate to provide desired silica embedment in the carbon black composite aggregate.

In a preferred embodiment, the silica precursor and the carbon black feedstock are fed into the mixing chamber in a weight ratio of from 0.017 to 0.259. This aids in achieving desired level of silica embedment in the carbon black composite aggregate and preventing instability and agglomeration.

Suitable oxidative medium or oxidative gas that may be used in the method of the present invention is selected from air, nitrogen-oxygen mixture, pure oxygen and mixture thereof. The oxidative medium assists in the utilization of part of the pre-mixed blended feedstock as fuel for generating heat of combustion for heating up the reactor and maintaining the reactor temperature. Preferably, the reactor temperature is maintained between 800° C. and 1200° C.

In another embodiment, the carbon black feedstock comprises a fuel having high content of hydrocarbon. Preferably, the fuel having high content of hydrocarbon is selected from various sources such as petroleum or its derivatives, heavy hydrocarbon oils, recovered pyrolysis oils and mixtures thereof.

In a yet another embodiment, the silica precursors are selected from organosilanes and organosilicates. The preferred organosilanes include, but are not limited to, tetrachlorosilane, trichloromethylsilane, propyltriethoxysilane and volatile silicone polymers such as octamethylcyclotetrasiloxane (OMTS). Examples of organosilicates include, but are not limited to, trimethoxyorthosilicate, triethoxyorthosilcate, tetraethoxyorthosilicate (TEOS) and tetramethoxy orthosilicate (TMOS).

In a further embodiment, the flame burner of the reactor assembly is covered with a perforated tube assembly. The perforated tube assembly comprises an inlet for supply of an inert gas around the flame burner of the reactor assembly.

Accordingly, the method comprises a step of supplying an inert gas around the flame burner of the reactor assembly.

In a still further embodiment, the pre-mixed blended feedstock is utilized partially to generate the heat of combustion to maintain the reactor temperature and the remaining feedstock takes part in decomposing and forming the composite aggregate.

The silica embedded carbon black composite aggregate formed by the method of the invention is collected in a collector assembly. The collector assembly is installed in-line with the flow of the synthesized composite aggregate to filter the final product, that is the composite aggregate.

Preferably, the collector assembly is made from hydrophilic glass fibers having open face assembled filters. Such filters have a pore size in a range of from about 0.5 μm to about 1.5 μm.

In a second aspect, the invention discloses a silica embedded carbon black composite aggregate prepared by the method as disclosed herein. The silica embedded carbon black composite aggregate of the invention is an in-situ synthesized silica embedded carbon black composite aggregate.

The weight percent of the embedded silica filler in the carbon black composite aggregate is in a range of from about 1% to about 60%. Preferably, the embedment level of the silica filler in the carbon black composite aggregate is from about 30% to about 60%.

The silica embedded carbon black composite aggregate of the invention is further characterized by its BET surface area. The BET surface area of the silica embedded carbon black composite aggregate is in a range of from about 20 $m^2/g$ to about 180 $m^2/g$, preferably from about 40 $m^2/g$ to about 180 $m^2/g$, and more preferably from about 78 $m^2/g$ to about 157 $m^2/g$.

The silica embedded carbon black composite aggregate of the invention is suitable for use in a rubber composition for improving its dynamic and physical properties and performance.

In a third aspect, the invention discloses a rubber composition comprising a rubber component and the silica embedded carbon black composite aggregate as disclosed herein. The rubber composition may be used in tyres and other rubber products.

In particular, the rubber composition comprises 100 phr of the rubber component and the silica embedded carbon black composite aggregate is present in the composition in an amount of from 40 to 70 phr with respect to 100 phr of the rubber component.

It has been observed that the silica embedded carbon black composite aggregate works well with general purpose rubbers. Thus, general purpose rubbers can be used in the present composition.

In a preferred embodiment, the rubber component is a synthetic rubber or a natural rubber or a mixture thereof.

More preferably, the rubber component is selected from the group consisting of homopolymers, copolymers, and terpolymers manufactured from 1,3 butadiene, styrene, isoprene or isobutylene and a mixture thereof.

The inventors have found out that the above-described composition comprising the silica embedded carbon black composite aggregate as disclosed herein surprisingly shows good dispersion and distribution of fillers in the rubber matrix resulting in effective rubber-filler interaction. It is well known that good dispersion of fillers in rubber matrix is highly desirable as it leads to improved dynamic and physical properties of the rubber compound.

In a fourth aspect, the invention discloses a tyre comprising the rubber composition as disclosed herein.

It is to be understood that both the foregoing description and the following detailed description are exemplary and explanatory only and are intended to provide further explanation of the present invention, as claimed. Additional features and advantages of the present invention will be set forth in part in the description which follows, and in part will be apparent from the description.

BRIEF DESCRIPTION OF THE ACCOMPANYING DRAWINGS

The invention will be further described with reference to the following examples and accompanying drawings. The examples are provided simply for the purposes of illustration and not limitation.

DETAILED DESCRIPTION OF THE INVENTION

Figure 1:
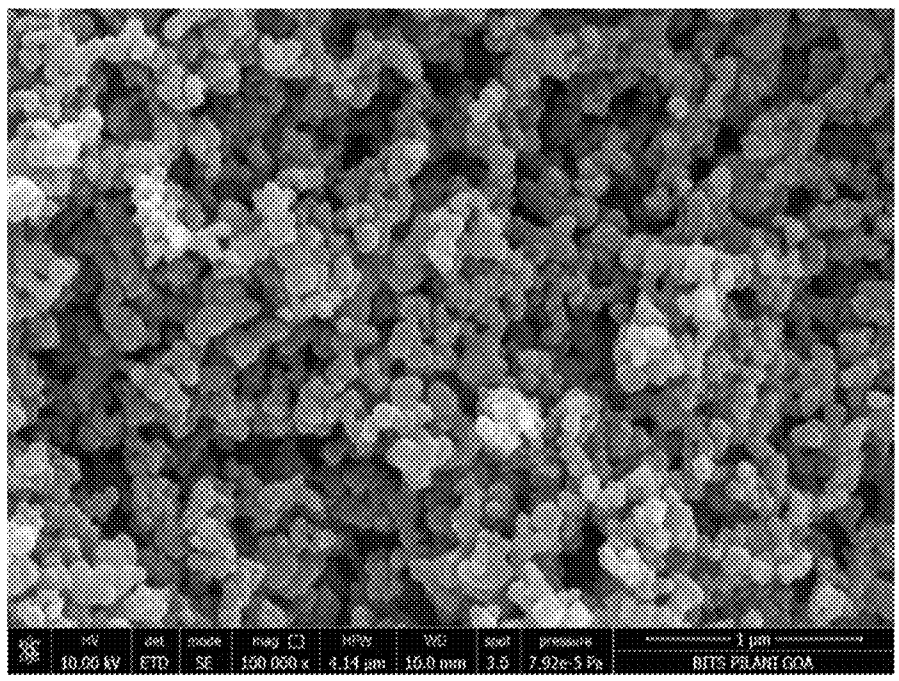
FIG. 1 shows Field Emission Scanning Electron Microscopy (FESEM) morphological characteristics of the carbon black aggregate formed in accordance with Example 1.
Figure 2A:
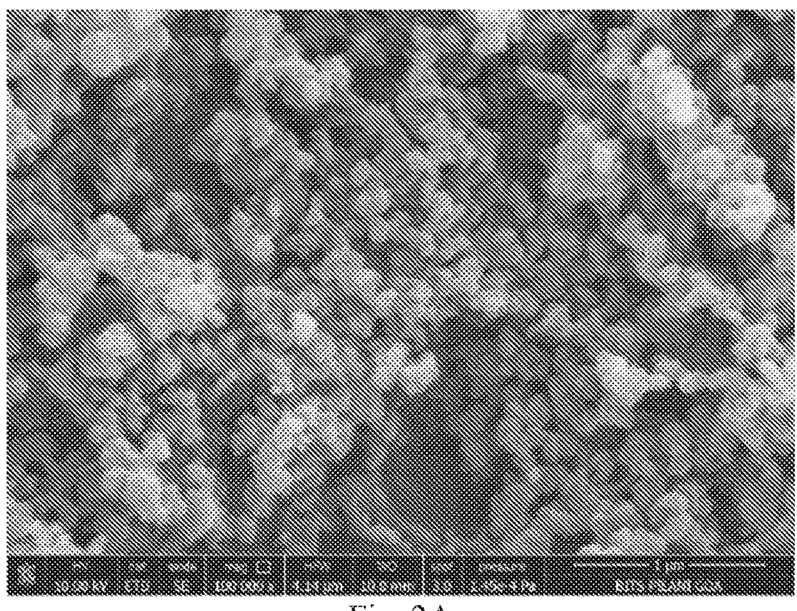
FIG. 2A shows surface morphology of the composite aggregate with 1% silica embedment synthesized in Example 2.
Figure 2B:
FIG. 2B depicts elemental composition of the 1% silica embedded composite aggregate synthesized in Example 2.
Figure 2B:
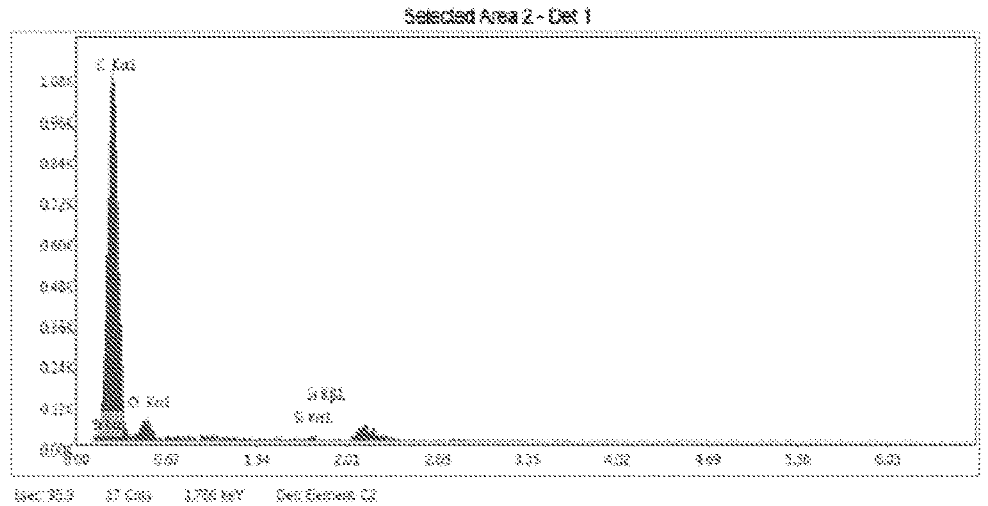
Figure 2C:
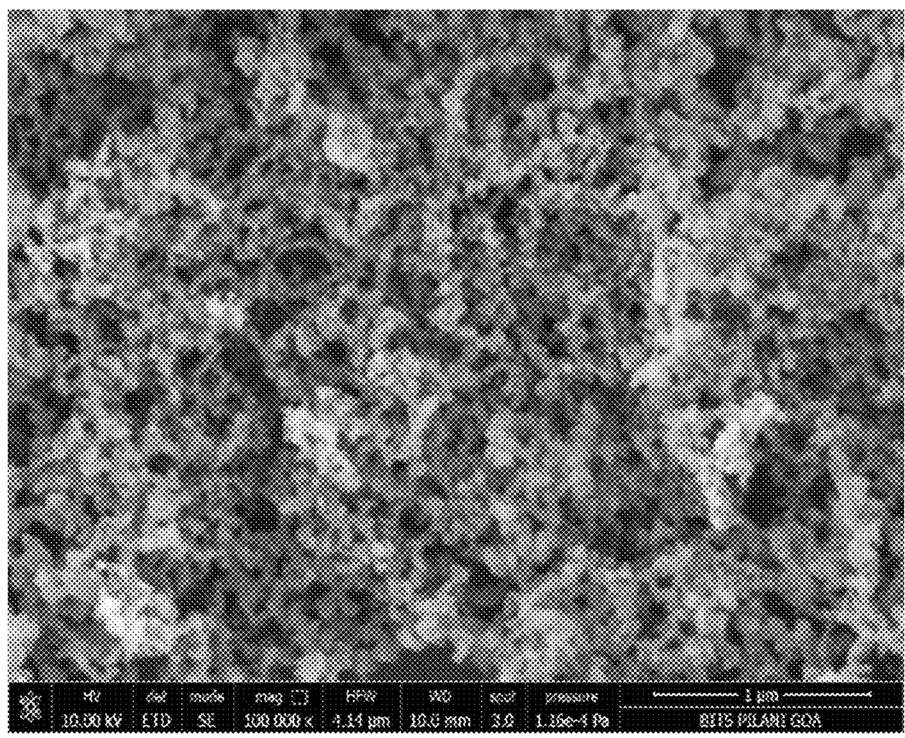
FIG. 2C depicts surface morphology of the composite aggregate with 8% silica embedment synthesized in Example 2.
Figure 2D:
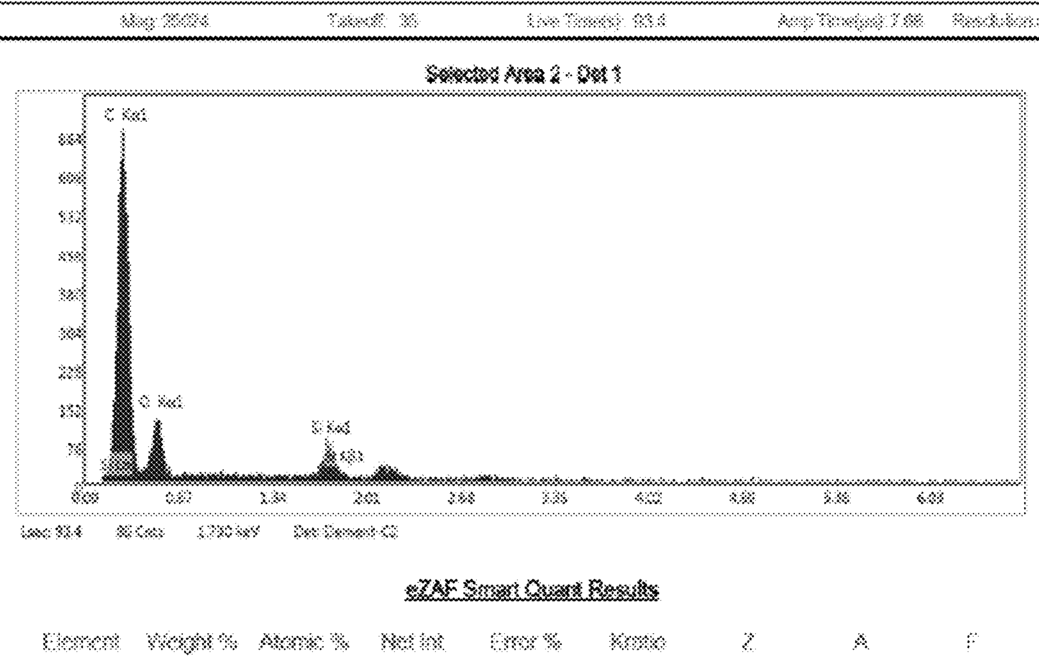
FIG. 2D depicts elemental composition of the 8% silica embedded composite aggregate synthesized in Example 2.

A novel method has been disclosed for preparing a silica embedded carbon black composite aggregate that has two different particles, namely silica and carbon black, present in a single aggregate.

Unlike the state of the art which describes dual- or multi-phase fillers wherein the filler materials are physically absorbed one over the other, the method of the invention enables synthesis of a unified aggregate of two different fillers.

The method of the invention improves energy efficiency of the overall method for preparing the composite aggregate. It increases the conversion efficiency of feed to product. It provides an in-situ synthesis mechanism for making a single aggregate of two fillers. The method disclosed herein produces a single unified aggregate, that is a composite aggregate of the mineral filler such as silica and carbon black wherein the silica is embedded in the carbon black.

While the invention as disclosed essentially uses silica as a mineral filler, the method disclosed herein may also be used effectively for embedment of other mineral fillers in the carbon black to provide a unified aggregate.

The reactor used for the synthesis of the silica embedded carbon black composite aggregate has the configuration similar to that of widely used reactors for the production of various grades of furnace carbon black.

Preferably, for an effective performance of the method of the invention, the reactor may be modified. The reactor employed for the performance of the present method employs the feedstock itself as fuel for combustion. The external fuel sources can be replaced by the feedstock itself, that gets combusted to produce hot gases leading to increase in the reactor temperature and production of the soot aggregate in the same process. The preferred reactor thermal conditions are achieved by the partial combustion of the feedstock when the temperature is in a range of from 800° C. to 1200° C. This effective arrangement leads to increase in the conversion of the feed to product providing higher efficiency of the method.

Another modification that has been proposed in the current invention is to change the orientation of the reactor mounting from horizontal to vertical. The horizontal mounting leads to increase in drag force on boundary layers causing more particles to adhere to reactor lines than travel towards the quenching zone. The vertical mount configuration leads to increase in soot particle velocity as flame propagates the particles upwards. This effect leads to decrease in drag forces generated by the gravity and particle weight. The drag forces decrease due to much higher counter balance force of buoyancy. As a result, the collection efficiency also tends to increase adding to further improvement in the conversion efficiency of the overall reaction.

The earlier known processes for producing multi-phase fillers containing silica and carbon black aggregate have resulted in final products having secondary filler absorbed on the surface of the primary particles i.e., carbon black particles. The known processes do not necessarily produce a single unified aggregate containing both phases of fillers. The current invention overcomes this drawback by changing the flame dynamics to reduce oxidative environment. The conventional furnace black reactor has provision for making the reactor environment highly oxidative so as to produce higher carbon black soot particles. In the present invention, flame burner of the reactor assembly is covered with a perforated tube assembly and an inert gas is supplied inside the reactor assembly which create a reduced oxidative environment around flame which leads to lack of oxygen causing a partial combustion of much higher degree than general furnace black condition. The reduced oxidative condition around the flame is utilized in producing in-situ material of carbon-silica aggregate in which both the carbon black and silica particles are present in a single aggregate as opposed to the attachment of the secondary filler particles on the surface of primary particles.

To produce the silica embedded carbon black composite aggregate of the present invention with the reactor described above, carbon black feedstock and silica precursor are fed to a mixing chamber of the reactor assembly in a predefined ratio to obtain desired impregnation of silica in the carbon black composite aggregate. Preferably, the silica precursor and carbon black feedstock are fed to a mixing chamber in a ratio defined in Table A. The carbon black feedstock can contain additional materials or compositions which are commonly used to make conventional carbon black. The carbon black feedstock and silica precursor are then mixed to form a premixed blended feedstock. The oxidative gases are diffused through the premixed blended feedstock of carbon black and silica precursor in the mixing chamber which forces the blended feedstock into burner nozzle of the flame burner of the reactor assembly. Flame is generated by combustion of part of the premixed blended feedstock. The presence of alkoxy based silica precursor increases the heating rate leading to faster generation of the soot particles. The silica particles formed during combustion act as a nucleation site on which carbon black soot forms and grows into aggregates containing both silica and carbon black in a single aggregate referred to as in-situ formations. The aggregated particles move towards the collection assembly where the reaction is stopped by quenching thereby cooling the overall system. The final aggregates are then collected in a filter assembly and separated by mechanical shaking of the filter.

TABLE A

Ratio of Silica to Carbon Black feedstock

| Ratio of Silica to Carbon Black feedstock | 0% silica | 1% silica | 8% silica | 14% silica | 22% silica | 32% silica | 41% silica | 57% silica |
|---|---|---|---|---|---|---|---|---|
| | — | 0.017 | 0.035 | 0.071 | 0.111 | 0.154 | 0.201 | 0.234 |

The silica embedded carbon black composite aggregate of the invention is an in-situ synthesized silica embedded carbon black composite aggregate. As shown in the examples hereinbelow, the composite aggregate synthesized according to the method of the invention using the silica precursor and carbon black feedstock in the ratio defined in Table A has desired impregnation of the silica in the carbon black composite aggregate. The weight percent of the embedded silica filler in the carbon black composite aggregate is in a range of from about 1% to about 60%. Preferably, the embedment level of the silica filler in the carbon black composite aggregate is from about 30% to about 60%.

The silica embedded carbon black composite aggregate of the invention is further characterized by its BET surface area. Preferably, the BET surface area of the silica embedded carbon black composite aggregate is in a range of from about 20 $m^2/g$ to about 180 $m^2/g$, preferably from about 40 $m^2/g$ to about 180 $m^2/g$, and more preferably from about 78 $m^2/g$ to about 157 $m^2/g$.

The silica embedded carbon black composite aggregate of the invention is suitable for use in a rubber composition.

As shown in the following examples, the composite aggregates prepared with the method of the present invention show unexpectedly good dispersion and distribution in rubber matrix when they are incorporated into a rubber composition. It is well known that good dispersion of fillers in the rubber matrix leads to improved dynamic and physical properties and performance of the rubber compounds.

EXAMPLES

The following examples describe synthesis of the silica-carbon black composite aggregates with varying levels of silica embedment in accordance with the method of the present invention. The preparation of the conventional carbon black using the method of the present invention has also been described for comparison with the composite aggregates of the invention. In addition, the dispersion studies of the silica embedded carbon black composite aggregates in rubber matrix have been described.

For characterization of the conventional carbon black and silica embedded carbon black composite aggregates prepared by the method of the present invention, various measurements were taken by carrying out tests known in the art. The general explanation of the tests performed and their relevance in characterizing carbon black aggregates is provided in Table B.

TABLE B

General explanation of tests performed

| Test | Procedure | Relevant value(s) | Explanation |
|---|---|---|---|
| Surface Area by Nitrogen Adsorption (BET Method) | ASTM D 6556 | Since the shape of carbon black particles is spheroidal, the average particle diameter can be evaluated from the surface area result. | The surface area is an essential morphological characteristic for the reinforcing capacity of carbon black since it indicates the extension of the interface, such as the availability of the surface for the crosslink between rubber chain and carbon black. The surface area measurements not only help in determining how much area is available for crosslinking of rubber with the carbon black but also in providing the porosity data of the carbon black particulates. |
| Oil Absorption Number (OAN) | ASTM D 2414 | Evaluating total volume of space between carbon black aggregates | Understanding the structure of carbon black is crucial. It helps in identifying the real |

TABLE B-continued

General explanation of tests performed

| Test | Procedure | Relevant value(s) | Explanation |
|---|---|---|---|
| | | using dibutyl phthalate (DBP). | volume of filler in the rubber-filler system and level of strain amplification of the deformable phase. A higher structure of the carbon black will lead to more irregular shape of aggregates with better dispersion capacity. |
| Surface Morphology | FESEM/EDX | Morphology and topographical configuration | FESEM studies provide information on the size and distribution of filler aggregates while EDX analysis provides elemental composition and distribution of the elements in the aggregates. This helps in assessing the unified aggregate distribution with respect to carbon black and silica. |
| Surface Energy | Inverse Gas Chromatography or Contact angle method | Total surface energy (dispersive energy and specific energy) | Surface energy is one of the critical parameters in understanding the level of dispersion as well as correct hysteresis balance. Surface energy is a two-component system, the two components being dispersive component which correlates with dispersion of filler in the polymer matrix and specific component which correlates with hysteresis balance. This assessment assists in understanding the degree of surface energy of the aggregate and selecting the right filler-polymer combination based on the desired application. |
| Functional Groups identification | Infrared spectroscopy | Functional group chemistry visualizations | Identification of functional group on the surface of filler aggregates helps in understanding the interaction of filler material with polymer matrix. |
| Silica particle quantification (mineral part in the aggregate) | The hydrofluoric acid (HF) treatment | Post treatment of aggregate samples is carried out using 5% v/v concentration of HF at boiling temperature for 30 minutes. After the treatment, the samples are washed and filtered till the mixture shows neutral pH with water. Thereafter the washed aggregates are dried at 60° C. in preparation for further analysis. | It gives quantitative values of silica (mineral) material in the final composite aggregate. The ash content of the respective aggregates is measured according to the procedure described in ASTM D1506. The ash content of a carbon black is the amount of non-carbon components present after combustion. |

Example 1: Preparation of conventional carbon black from carbon black feedstock employing the method disclosed herein.

Carbon black feedstock and combustion medium (combustion air) were injected into a reactor described hereinabove. The flow characteristics of the feedstock and combustion medium are shown in Table 1.

TABLE 1

Flow characteristics of feedstock and combustion medium

| Description | Flow Conditions (ml/minute) |
|---|---|
| Combustion Air | 1100 |
| Carbon black Feedstock | 270 |

As shown in Table 1, the combustion air was injected in excess and it was allowed to diffuse through the feedstock. The excess of combustion air was required to maintain the combustion environment in the reactor and prevent the build-up of the flue gases. Pyrolysis of the feedstock at incomplete combustion level led to the formation of carbon black soot particles. The particles so formed travelled through the flue gases and were quenched in a heat exchange medium, i.e. water, leading to the formation of carbon black. The carbon black so formed has the analytical characteristics identified in Table 2.

TABLE 2

BET and OAN of Carbon Black

| Description | Observation |
|---|---|
| BET Surface Area ($m^2/g$) | 75-76 |
| Oil Absorption Number (ml/100 g) | 101-104 |

The characteristics listed in Table 2 confirm that the carbon black formed resembles the ASTM N330 grade carbon black.

Morphological analysis done using FESEM confirms the formation of carbon black aggregates having grape uniform aggregations of up to 500 nm (FIG. 1).

Example 2: Preparation of silica embedded carbon black composite aggregate from a pre-mixed blended feedstock using low silica precursor dosage of from 1% to 8%.

Silica embedded carbon black composite aggregate with low silica embedding in carbon black aggregates was prepared in a reactor described above according to method of the present invention.

Carbon black feedstock, silica precursor (TEOS of Sigma-Aldrich from organosilane group) and combustion medium (combustion air and inert gas) were injected into a mixing chamber of a reactor assembly. The flowrate of the carbon black feedstock is maintained at 270 ml/minute (See Table 3) as in Example 1 to maintain the constant temperature in the reactor assembly so that the efficiency of the reactor is maintained with higher conversion. The flow rate of the silica precursor was adjusted to alter the weight percent of silica in the final silica embedded carbon black composite aggregate. The combustion air and inert gas were diffused through the blended feedstock prepared by pre-mixing of the silica precursor (TEOS) and carbon black feedstock in a predefined composition (See Table A) in a mixing chamber prior to feeding it to a flame burner of the reactor assembly.

TABLE 3

Flow characteristics of the pre-mixed blended feedstock with a low silica precursor dosage of from 1% to 8%.

| Description | Flow Conditions (ml/minute) |
|---|---|
| Combustion Air + Inert gas ($N_2$) | 1578 |
| Carbon black Feedstock | 270 |
| Mineral-silica precursor feed | 5 to 12 |

The application of reducing flame dynamics (RFD) of jet flame in and around the burner nozzle of the flame burner enabled simultaneous or in-situ formation of the silica filler embedded carbon black composite aggregate.

The controlled dosage of the silica precursor in the carbon black feedstock also facilitated the in-situ formation of the composite aggregate with the desired embedment level of silica in the carbon black.

The weight percent of the silica in the carbon black was determined by conducting HF dilution test on the synthesized composite aggregate. The composite aggregate was diluted with HF which dissolved the mineral component and subsequent measurement allowed the quantification of the mineral-silica component in the final composite aggregate.

The analytical characteristics of 1% to 8% silica embedded carbon black aggregate are identified in Table 4.

TABLE 4

Analytical characteristics of 1% to 8% silica embedded carbon black

| Description | (1% silica) | (8 % silica) |
|---|---|---|
| BET Surface Area ($m^2/g$) | 77-78 | 79-80 |
| Oil Absorption Number (ml/100 g) | 101-102 | 98-100 |
| % Mineral-silica in carbon black | 1 | 8 |
| BET Surface Area post HF treatment ($m^2/g$) | 78 | 82 |

The surface area measured post HF dissolution of the resultant composite aggregate shows negligible change for 1% silica embedded carbon black composite aggregate. The 8% silica embedment has led to marginal increase in the BET surface area. This indicates the embedment of the silica particle in the carbon black composite aggregate to the extent that the silica component has become an intrinsic part of the aggregate as opposed to a mere physically absorbed entity.

The value of OAN of the composite aggregate implies that their tendency towards agglomeration is less and thus the composite aggregate when employed in a rubber compound formulation would, as shown in Example 8, result in a better dispersion and distribution of the fillers in the rubber matrix. Change in the OAN value as compared to that of the conventional carbon black produced in the Example 1 is marginal. This shows that silica particles of the carbon black aggregates are not causing agglomeration, rather they are well distributed in the final carbon black composite aggregate which leads to the stabilization of OAN values.

The morphological analysis was carried out using FESEM-EDX. As shown in FIGS. 2A, 2B, 2C and 2D, such analysis indicates the presence and distribution of the silica particles along with the carbon black phase in the composite aggregate. The surface morphology of the composite aggregate closely resembles the structure of the conventional carbon black.

Example 3: Preparation of silica embedded carbon black composite aggregate from a pre-mixed blended feedstock using silica precursor dosage of from 13.7% to 21.8%.

Silica embedded carbon black composite aggregates were prepared from a pre-mixed blended feedstock using silica precursor dosage of from 13.7% to 21.8% according to the method described in Example 2.

Flow characteristics of the pre-mixed blended feedstock comprising the carbon black feedstock, silica precursor and combustion medium (combustion air and inert gas) for a silica precursor dosage of from 13.7% to 21.8% are shown in Table 5.

TABLE 5

Flow characteristics of the pre-mixed blended feedstock with a silica precursor dosage of from 13.7% to 21.8%.

| Description | Flow Conditions (ml/minute) |
|---|---|
| Combustion Air + Inert gas ($N_2$) | 1578 |
| Carbon black Feedstock | 270 |
| Mineral-silica precursor feed | 22-32 |

The combustion air and inert gas flowrate was maintained to achieve reducing flame environment.

The flow conditions set forth above for the composite aggregate formation led to the preparation of a composite aggregate having analytical characteristics summarized in Table 6.

TABLE 6

Analytical characteristics of 13.7% & 21.8% silica embedded carbon black aggregate

| Description | (13.7% silica) | (21.8% silica) |
|---|---|---|
| BET Surface Area ($m^2/g$) | 79 | 87 |
| Oil Absorption Number (m1/100 g) | 104 | 112 |
| % Mineral-silica in carbon black | 13.7 | 21.8 |
| BET Surface Area post HF treatment ($m^2/g$) | 86 | 97 |

Figure 3A:
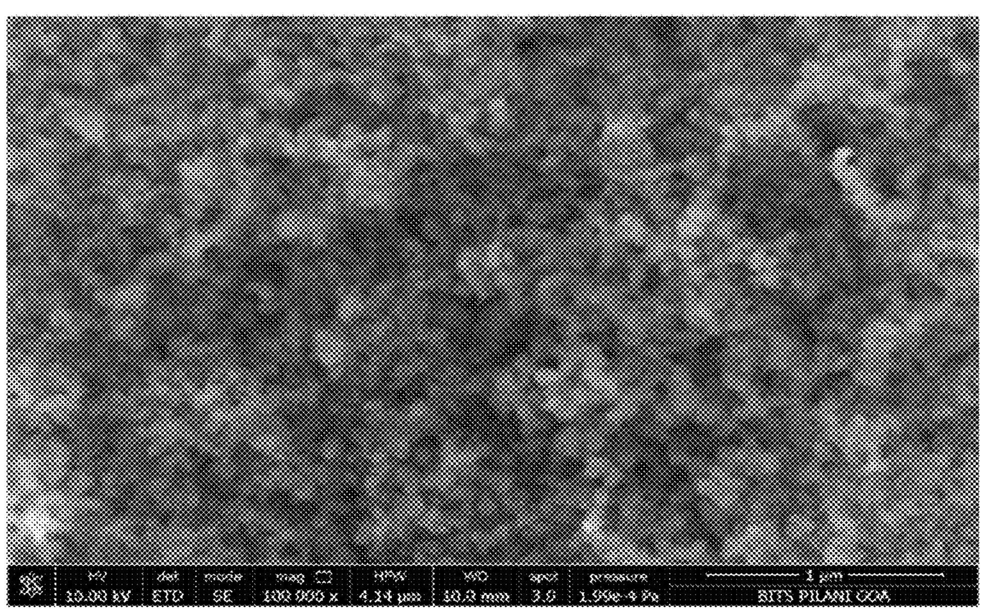
FIG. 3A depicts surface morphology of the composite aggregate with 13.7% silica embedment synthesized in Example 3.
Figure 3B:
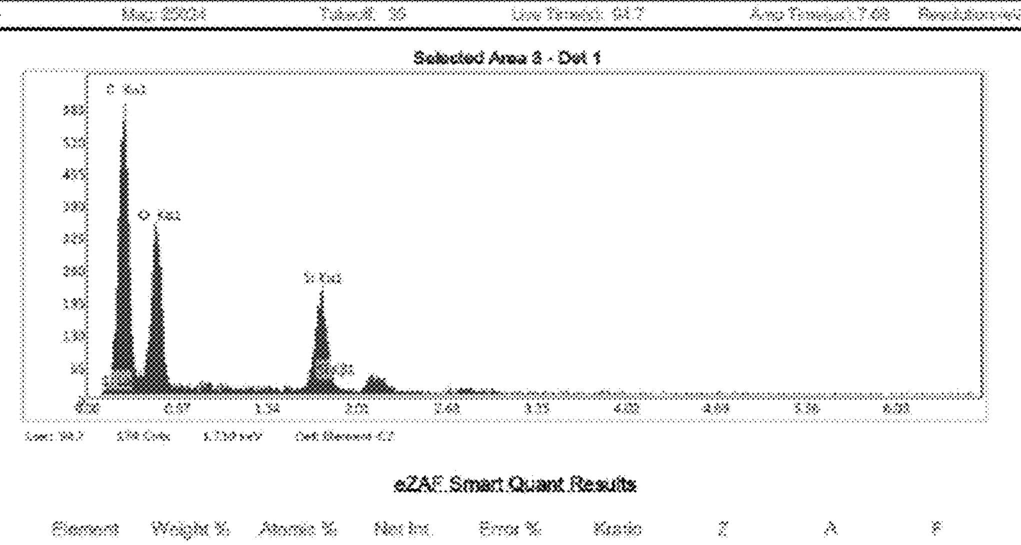
FIG. 3B depicts elemental composition of the 13.7% silica embedded composite aggregate synthesized in Example 3.
Figure 3C:
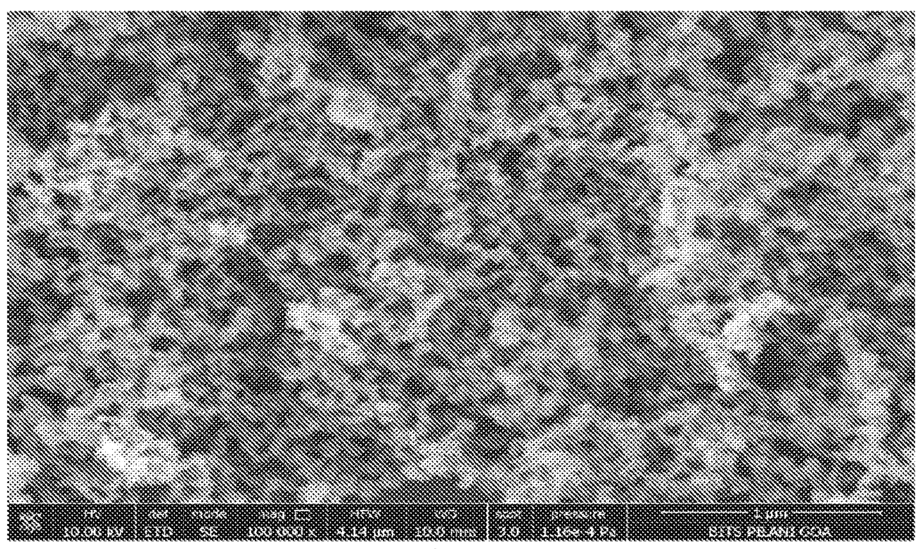
FIG. 3C depicts surface morphology of the composite aggregate with 21.8% silica embedment synthesized in Example 3.

As shown in FIG. 3A, the morphological studies of the composite aggregates done using FESEM indicate that the composite aggregate with 13.7% silica embedment has finer and uniform distribution of the silica filler. FIG. 3C also shows that the composite aggregates with 21.8% silica embedment have become finer.

Figure 3D:
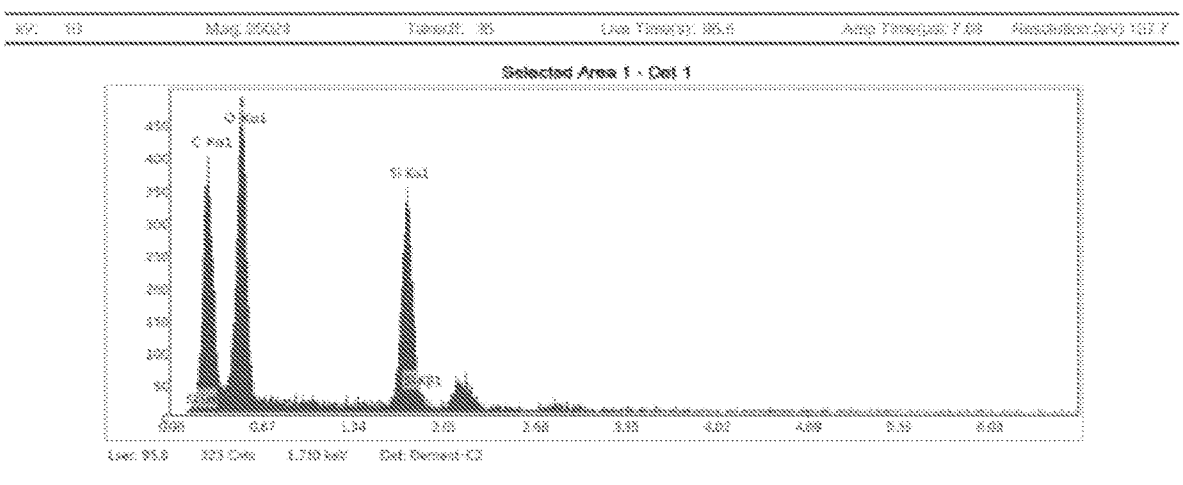
FIG. 3D depicts elemental composition of the 21.8% silica embedded composite aggregate synthesized in Example 3.

The presence of silica in the composite aggregate was quantified by EDX analysis. EDX study helps in quantifying the weight percentage (wt. %) of embedded mineral filler particles in the composite aggregate. As can be seen in FIG. 3B and FIG. 3D, such analysis demonstrates increase in the peak intensity for the silica element in the composite aggregate.

To substantiate further, the composite aggregates were post treated with HF to find out the wt. % embedment of mineral filler in the carbon black aggregate. The post treatment with HF (See Table 6) confirms that the silica quantity present in the composite aggregate is in line with the results obtained by FESEM-EDX analysis. The detachment of the silica particles from the composite aggregates after the HF treatment has resulted in the formation of micropores in the composite aggregates which has led to increase in surface area. This indicates that the silica filler particles are an intrinsic part of the composite aggregate as opposed to a mere physically absorbed independent entity.

Example 4: Preparation of silica embedded carbon black composite aggregate from a pre-mixed blended feedstock using silica precursor dosage of from 32.1% to 41.02%.

Silica embedded carbon black composite aggregates were prepared from a pre-mixed blended feedstock using silica precursor dosage of from 32.1% to 41.02% according to the method described in Example 2.

Flow characteristics of the pre-mixed blended feedstock comprising the carbon black feedstock, silica precursor and combustion medium (combustion air and inert gas) for a silica precursor dosage of from 32.1% to 41.02% are shown in Table 7.

TABLE 7

Flow characteristics of the pre-mixed blended feedstock with a silica precursor dosage of from 32.1% to 41.02%.

| Description | Flow Conditions (ml/minute) |
|---|---|
| Combustion Air + Inert gas ($N_2$) | 1578 |
| Carbon black Feedstock | 270 |
| Mineral-silica precursor feed | 44-54 |

The combustion air and inert gas flowrate was maintained to achieve reducing flame environment.

The flow conditions set forth above for the composite aggregate formation led to the preparation of a composite aggregate having analytical characteristics summarized in Table 8.

TABLE 8

Analytical characteristics of 32.1 % to 41.02 % silica embedded carbon black aggregate

| Description | (32.1% silica) | (41.02% silica) |
|---|---|---|
| BET Surface Area ($m^2/g$) | 107 | 133 |
| Oil Absorption Number (ml/100 g) | 113 | 143 |
| % Mineral-silica in carbon black | 32.1 | 41.02 |
| BET Surface Area post HF treatment ($m^2/g$) | 123 | 157 |

A higher level of the mineral-silica embedment in the composite aggregate is achieved by following the above conditions according to the method of the present invention. The HF dissolution test carried out to quantify the presence of the mineral-silica and surface area analysis carried out post HF treatment show the high-level embedment of the silica filler in the carbon black composite aggregate.

Figure 4A:
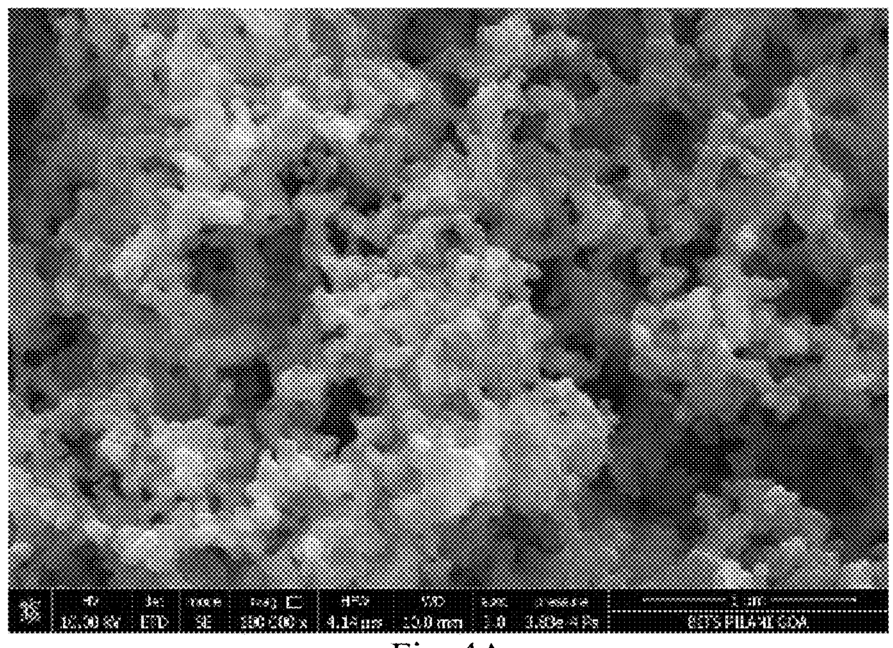
FIG. 4A depicts surface morphology of the composite aggregate with 32.1% silica embedment synthesized in Example 4.

As shown in FIG. 4A, the morphological studies of the composite aggregate done using FESEM indicate that the composite aggregate prepared by the aforesaid method has extremely fine networking of the filler aggregates. The presence of the silica component at 32.1% embedment level in the composite aggregate appears very fine but uniformity in distribution has been achieved.

Figure 4B:
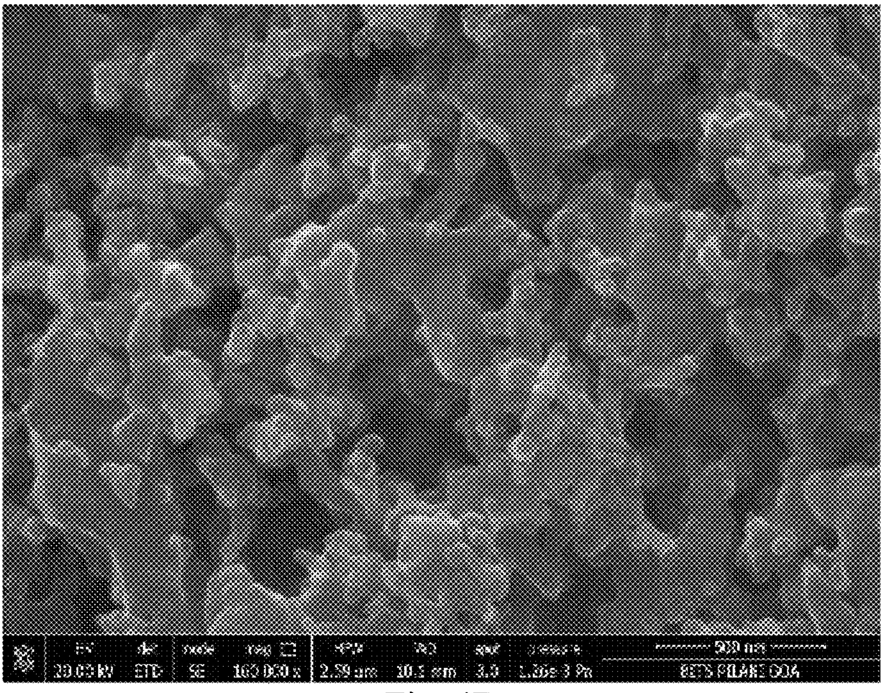
FIG. 4B depicts surface morphology of the composite aggregate with 41.02% silica embedment synthesized in Example 4.

It is observed from the FIG. 4B that a highly dense network of the carbon black composite aggregate appears when the embedment level of silica in the composite aggregate is 41.02%. By increasing the silica embedment in the carbon black, the hinderance effect appears to decrease and the presence of higher silica particles appear to trigger agglomeration of carbon black aggregates.

However, it is confirmed by the FESEM-EDX analysis that, even for the silica dosage at 41.02%, the silica embedded carbon black composite aggregate retains a uniform carbon black morphology. This confirms that the composite aggregate with silica embedment level up to about 41% in the carbon black prepared according to the method of the invention is viable.

Example 5: Preparation of silica filler embedded carbon black composite aggregate from a pre-mixed blended feedstock using a high silica precursor dosage of 57%.

Even though the formation of a highly dense network of the carbon black composite aggregate was observed when the embedment level of silica in the composite aggregate was 41.02%, a further experiment was carried out to verify if it was possible to achieve a still higher level of silica embedment in the carbon black composite aggregate. Silica filler embedded carbon black composite aggregates were prepared from a pre-mixed blended feedstock using silica precursor dosage of 57% according to the method described in Example 2.

Flow characteristics of the pre-mixed blended feedstock comprising the carbon black feedstock, silica precursor and combustion medium (combustion air and inert gas) for a silica precursor dosage of 57% are shown in Table 9.

TABLE 9

Flow characteristics of the pre-mixed blended feedstock with a silica precursor dosage of 57%.

| Description | Flow Conditions (ml/minute) |
|---|---|
| Combustion Air + Inert gas ($N_2$) | 1578 |
| Carbon black Feedstock | 270 |
| Mineral-silica precursor feed | 63-65 |

The combustion air and inert gas flowrate was maintained to achieve reducing flame environment.

The flow conditions set forth above for the composite aggregate formation led to the preparation of a composite aggregate having analytical characteristics summarized in Table 10.

TABLE 10

Analytical characteristics of 57% silica embedded carbon black aggregate

| Description | (57% silica) |
|---|---|
| BET Surface Area ($m^2/g$) | 173 |
| Oil Absorption Number (ml/100 g) | 157 |
| % Mineral-silica in carbon black | 57 |
| BET Surface Area post HF treatment ($m^2/g$) | 191 |

The BET surface area analysis pre- and post-HF treatment indicates some change in the BET surface area of the composite aggregate.

Figure 5:
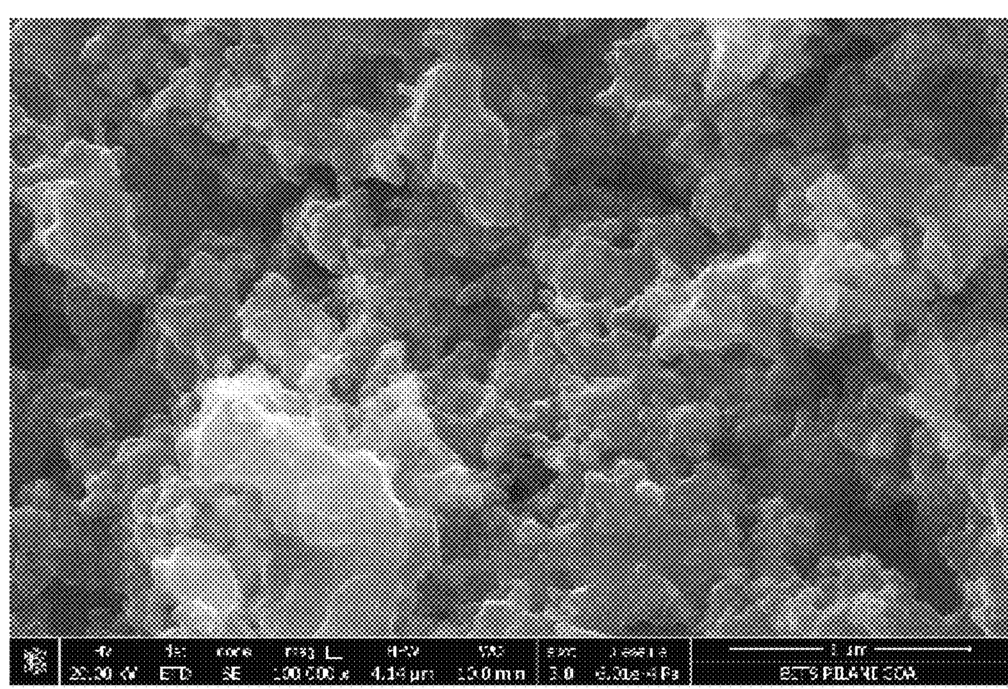
FIG. 5 depicts surface morphology of the composite aggregate with 57% silica embedment synthesized in Example 5.

By increasing the silica embedment in the carbon black, the hinderance effect appears to decrease and the presence of higher silica particles appears to trigger agglomeration of the carbon black composite aggregates (See FIG. 5).

However, it is extremely significant that the composite aggregate with a high silica embedment level of 57% in the carbon black could be successfully prepared according to the method of the invention.

Example 6: Surface chemistry characterization of the composite aggregate using Infrared spectroscopy Infrared spectroscopy is a well-established analytical method to study surface chemistry of materials and compounds and it has been used in the past to characterize the surface of silica and carbon black.

In all the experiments exemplified above, the samples of the composite aggregates were run in the FT-IR instrument operating in the transmission mode. The IR scans were obtained from 4000 $cm^{-1}$ to 400 $cm^{-1}$ performing typically 16 scans at a resolution of 2 $cm^{-1}$. The samples were dried for two hours at 125° C. before they were set for analysis to eliminate the moisture interference in the analysis.

Figure 6:
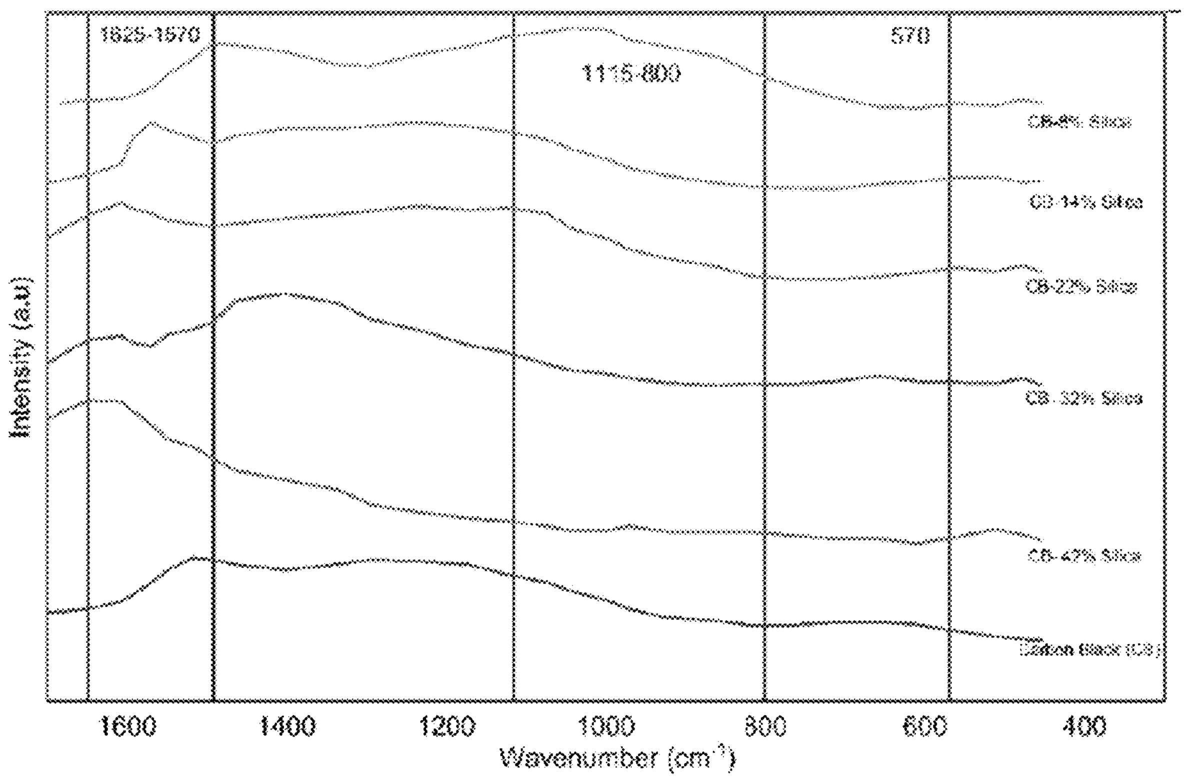
FIG. 6 depicts infrared (IR) spectra of the composite aggregate.

The samples of the composite aggregates were analyzed with a full range IR spectrum as shown in the FIG. 6. The region above 3000 $cm^{-1}$ wavenumbers contains information about the silanols. For the carbon black and composite aggregates, the peak at 3000 $cm^{-1}$ is not observed due to interference caused by the presence of large water band.

In the IR region from 450 $cm^{-1}$ to 1800 $cm^{-1}$, there are two predominant bands located at about 1600 $cm^{-1}$ to 1625 $cm^{-1}$ and the other at 1115 $cm^{-1}$. The 1600 $cm^{-1}$ to 1625 $cm^{-1}$ region has been assigned to bulk carbon and adsorbed water, respectively and the 1100 $cm^{-1}$ region has been ascribed to $SiO_2$ networks.

The presence of the peaks at 1115 $cm^{-1}$ along with 1600 $cm^{-1}$ to 1625 $cm^{-1}$ for composite aggregates confirms the blend of carbon black and silica together, but peak at 1115 $cm^{-1}$ is not present in the carbon black specimen.

There are no signature peaks for any halide groups or any alkoxy groups present in the IR analysis. This indicates the absence of any toxic residue in the composite aggregates formed by the method of the present invention. This is an added advantage of the method of the present invention that the silica embedded carbon black aggregates produced thereby are environmentally friendly.

Example 7: Surface energy measurement of the composite aggregate.

The surface energy measurement is an analytical technique used to quantify the interaction of one solid material with other by measuring different components of surface energy. For reinforcing filler material such as carbon black and silica, the measurement of the surface energy particularly its dispersive component helps in understanding the behavior of filler with polymer and also its impact on the polymer-filler interaction. This also provides an understanding of which technical and performance properties are likely to be affected most in case the reinforcing filler is used in a rubber formulation.

Analysis of the dispersive surface energy component of the composite aggregates prepared in accordance with the method described above was done using inverse gas chromatography (IGC).

For characterization of the composite aggregate surface, a series of alkanes were used to determine the non-polar or dispersive component of the surface energy. The values reported are average of the total energy observed for series of alkanes used.

Figure 7:
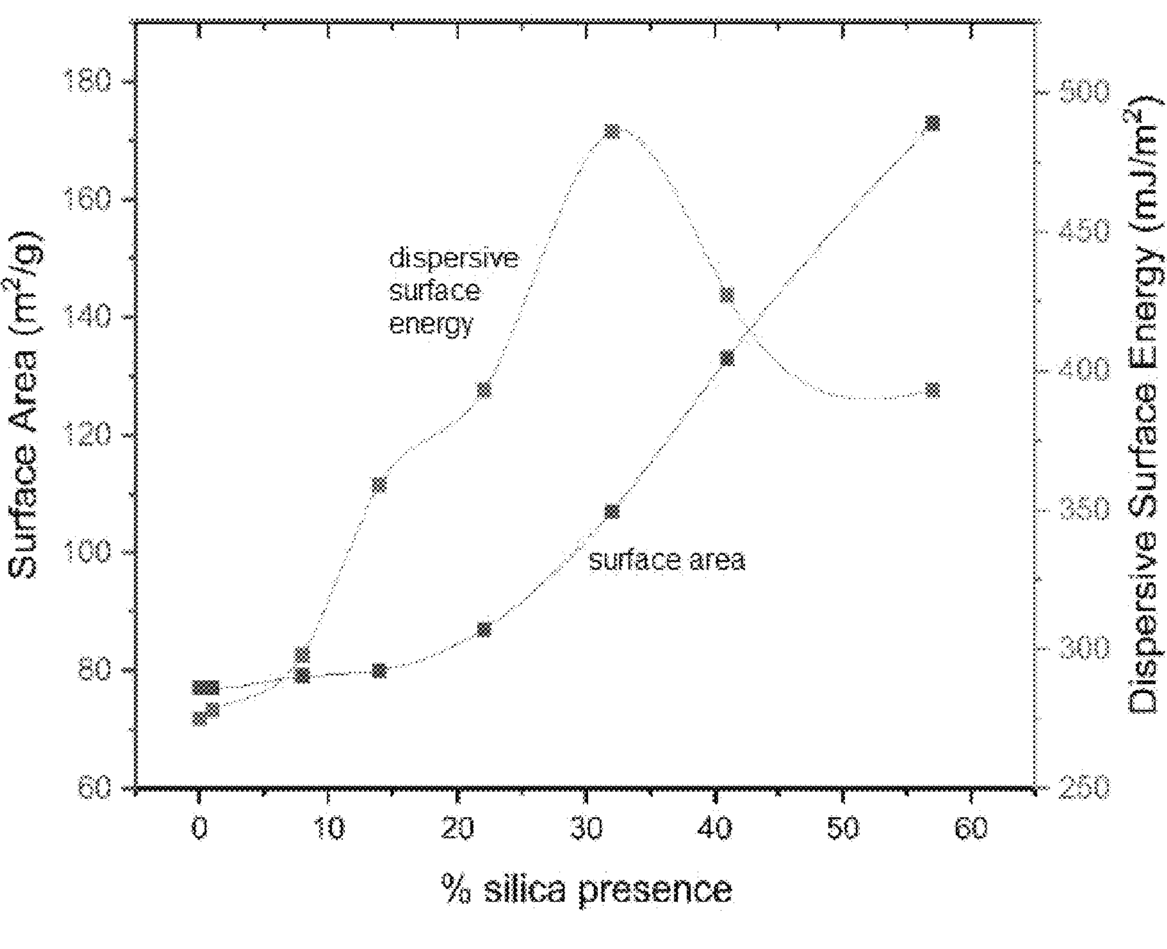
FIG. 7 depicts dispersive component of the surface energy of the composite aggregate.

The analytical results observed for the synthesized composite aggregates are shown in FIG. 7. The unique surface and microstructure of the synthesized composite aggregates appear to have caused an increase in the dispersive component of the surface energy as compared to that of the carbon black formed in Example 1.

Example 8: Dispersion studies of filler(s) in Rubber Matrix

TABLE 11

Rubber formulation

| SI. No | Ingredients | | Carbon Black (phr) | Carbon Black + silica (phr) | CB-silica (1%) (phr) | CB-silica (8%) (phr) | CB-silica (14%) (phr) | CB-silica (22%) (phr) | CB-silica (57%) (phr) | CB-silica (32%) (phr) | CB-silica (41%) (phr) | CB-silica (57%) (phr) |
|---|---|---|---|---|---|---|---|---|---|---|---|---|
| 1. | General Purpose Rubber | | 100 | 100 | 100 | 100 | 100 | 100 | 100 | 100 | 100 | 100 |
| 2. | Filler(s) | Carbon Black (CB) | 60 | 30 | — | — | — | — | — | — | — | — |
| | | Silica | — | 30 | — | — | — | — | — | — | — | — |
| | | Carbon Black-Silica Composite | — | — | 60 | 60 | 60 | 60 | 60 | 60 | 60 | 60 |
| 3. | Process Oil | | 12 | 12 | 12 | 12 | 12 | 12 | 12 | 12 | 12 | 12 |

Mixing Cycle

Several general-purpose rubber formulations including carbon black; equal proportions of carbon black and silica; and silica embedded carbon black composite aggregates having varying levels of silica embedment, respectively were prepared. The ingredients as mentioned in the Table 11 were mixed in a Brabender mixer of capacity 300 gm at an agitation speed of 60 rpms, having an initial temperature of 60° C. At time zero, the rubber was charged to the mixer and heated to a temperature of 80° C. The remaining components were added at t=1 min. The total mixing time for each batch was about 8 min.

Analysis

Specimens obtained from the mixing cycle were kept overnight for maturation and settlement dispersion, if any. A sample of 2 cm×2 cm was cut from the specimen obtained from each batch and treated with a fine gold-palladium to form a layer that increases conductivity in the vacuum environment. The samples were analyzed in a Field Emission-Scanning Electron Microscope (FESEM, FEG 250 Quanta), operating at a maximum electron beam current of 25 kV in 10 k magnifications in backscattered electron imaging (BEI) modes.

Figure 8:
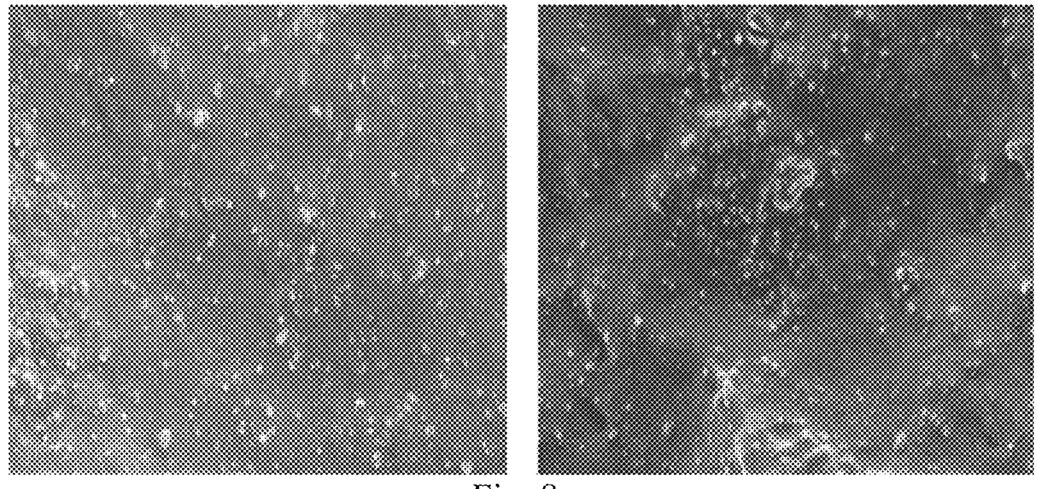
FIG. 8 shows two views of FESEM morphological characteristics of the rubber formulation containing the carbon black filler.
Figure 9:
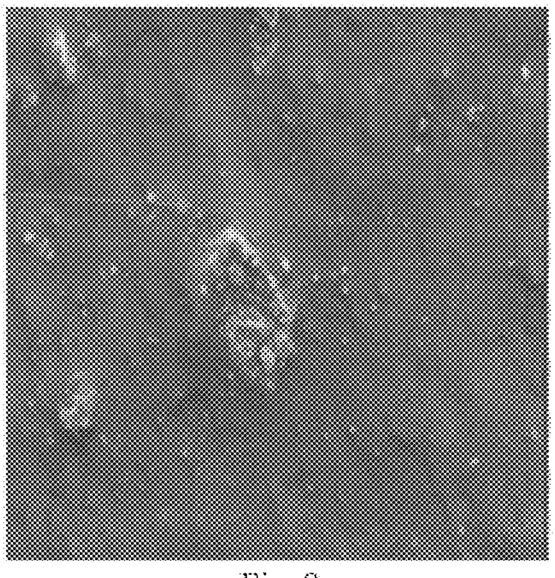
FIG. 9 shows FESEM morphological characteristics of the rubber formulation containing equal proportion of both carbon black and silica.

The mixing of the carbon black in the rubber matrix appears uniform in the rubber formulation sample containing only carbon black filler. Some uneven surfaces can be seen but that may be due to lack of any post processing of the sample obtained after mixing. Overall, the dispersion of the carbon black in the rubber matrix appears to be uniform (FIG. 8).

Where equal proportion of both carbon black and silica are mixed with the rubber in the absence of any coupling agent, the dispersion of the carbon black in the rubber matrix is good but silica particles' appearances on the surface are visible along with some silica clusters as shown in FIG. 9. This implies that the silica particles are not well dispersed in the rubber matrix.

Figure 10:
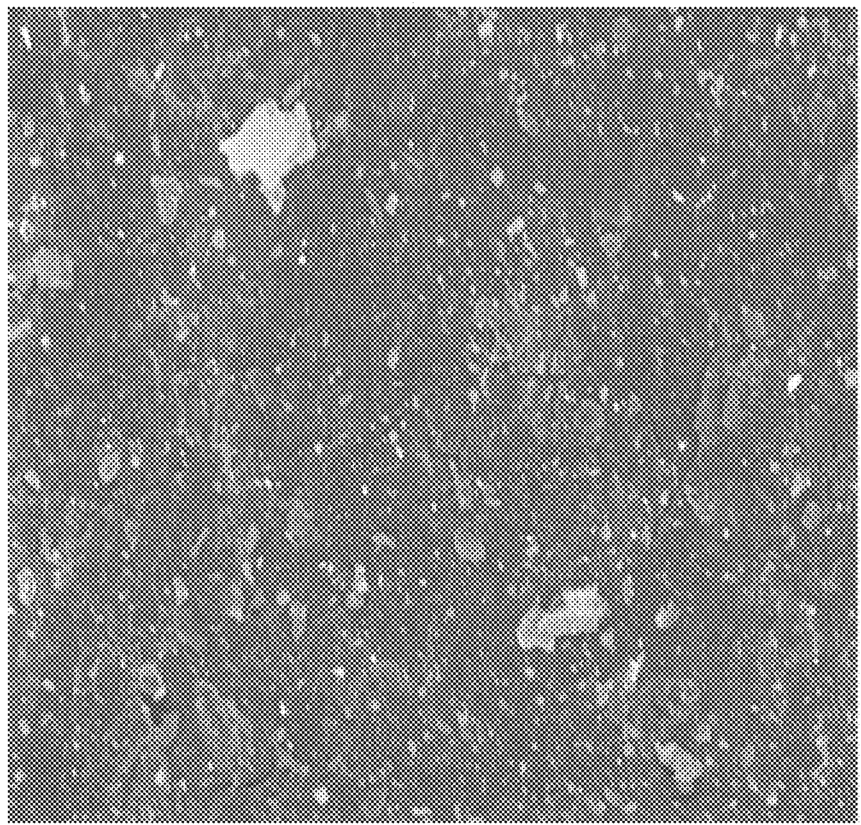
FIG. 10 shows FESEM morphological characteristics of the carbon black-(1%) silica composite aggregate containing rubber formulation.

As shown in the micrograph of FIG. 10, the mixing of carbon black-(1%) silica composite aggregate in the rubber matrix appears uniform. No residual traces of the silica appear on the surface. Some uneven surfaces can be seen but that may be due to lack of any post processing of the sample obtained after mixing.

Figure 11:
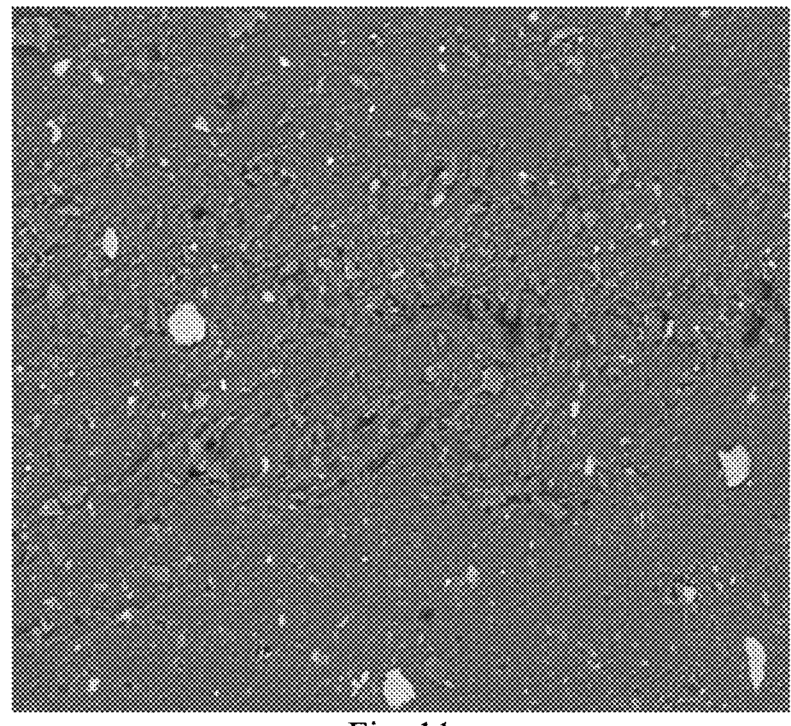
FIG. 11 shows FESEM morphological characteristics of the carbon black-(8%) silica composite aggregate containing rubber formulation.

In the carbon black-(8%) silica composite aggregate containing sample, the orientation of the sample appears to be uneven due to the absence of post milling. However, the dispersion of the composite aggregate in the rubber matrix is highly efficient and improved as compared to the other samples discussed above. It appears from the micrographs of FIG. 11 that the carbon black-(8%) silica composite aggregate behaves as a single unit and shows better polymer-filler interactions.

Figure 12:
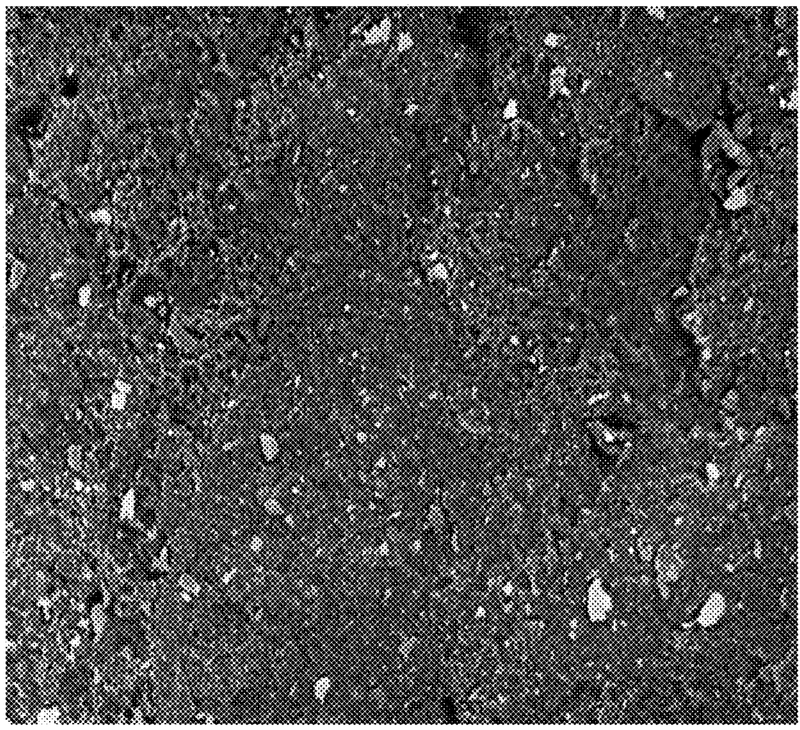
FIG. 12 shows FESEM morphological characteristics of the carbon black-(14%) silica composite aggregate containing rubber formulation.

In the carbon black-(14%) silica composite aggregate containing sample, a minor detachment of the polymer matrix is seen in the micrograph of FIG. 12. However, the detachment does not appear to relate to the polymer-filler interactions as no filler or composite aggregate particles are visible in the micrograph. In so far as the dispersion is concerned, the interaction between the composite aggregate and the polymer is better than conventional mixing of the fillers with the rubber compound shown in FIG. 9.

Figure 13:
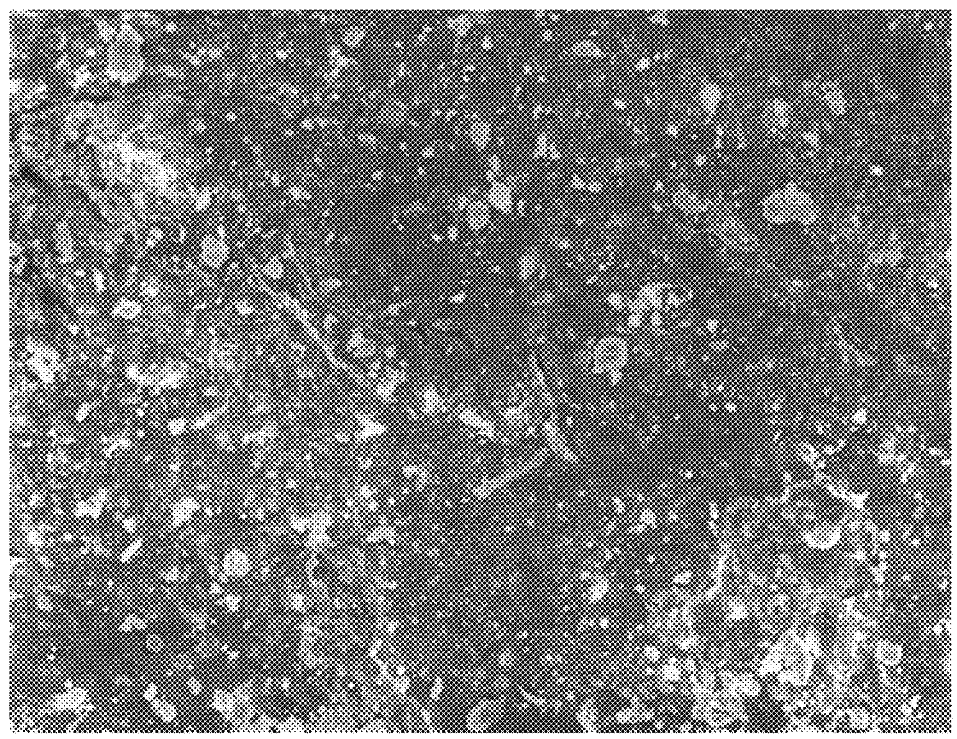
FIG. 13 shows FESEM morphological characteristics of the carbon black-(22%) silica composite aggregate containing rubber formulation.

It is observed from the micrograph of FIG. 13 that chips of the matrix appear on the surface of the carbon black-(22%) silica composite aggregate containing sample but it appears to be mainly due to the absence of any post processing steps. Dispersion of the composite aggregate into the matrix is good as no detachment of the matrix and aggregate particles is seen in the micrograph. Colour contrast can be seen but there is no bright crystalline appearance of the silica particles. This indicates that dispersion of the composite aggregate is better than that produced by the conventional mixing of the fillers with the rubber compound shown in FIG. 9.

Figure 14:
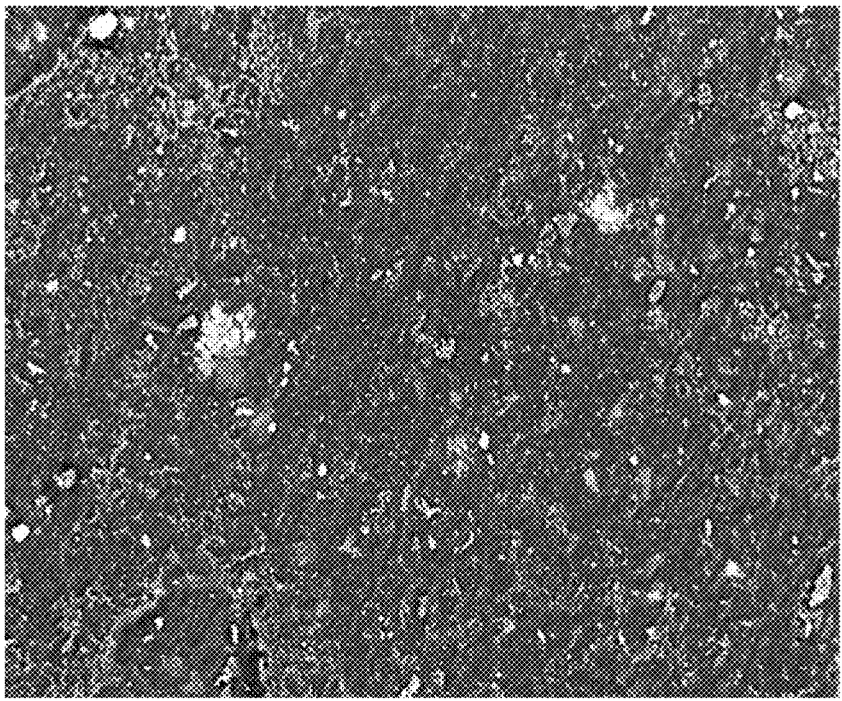
FIG. 14 shows FESEM morphological characteristics of the carbon black-(32%) silica composite aggregate containing rubber formulation.

As seen in the micrograph of FIG. 14 relating to the carbon black-(32%) silica composite aggregate containing sample, the polymer-filler interaction is maintained with overall good dispersion of the composite aggregate. No detachment of any polymer and aggregate particles is visible. The colour contrast can be seen in the micrograph but there is no indication of the high presence of crystalline silica particles. This indicates that dispersion of the composite aggregate is better than that produced by the conventional mixing of the fillers with the rubber compound shown in FIG. 9.

Figure 15:
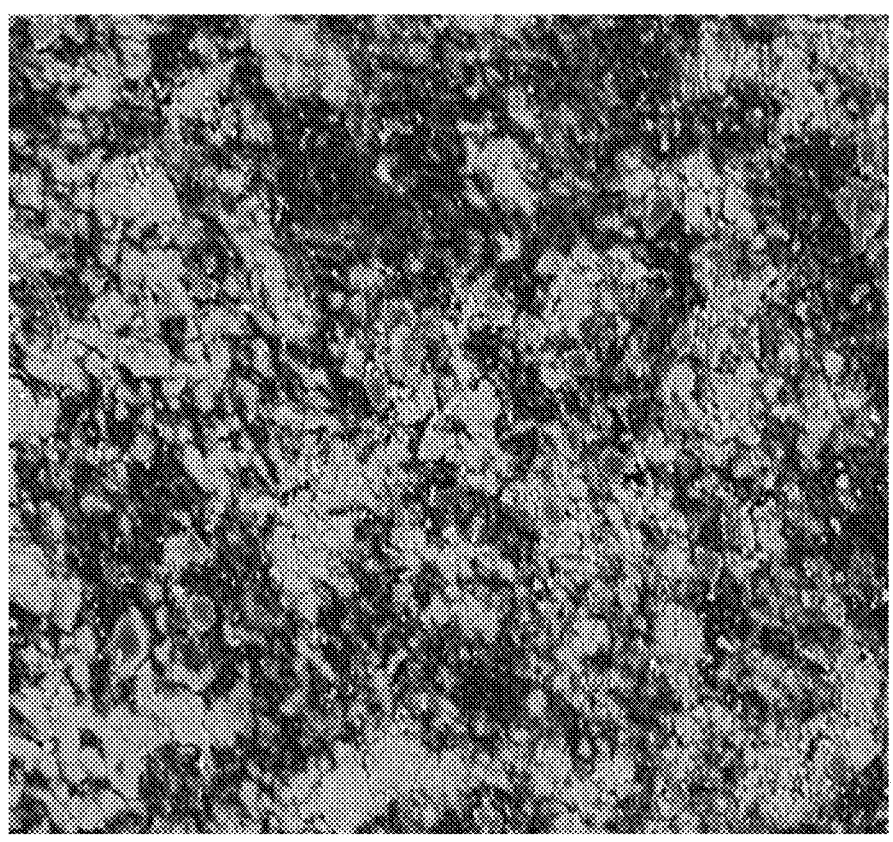
FIG. 15 shows FESEM morphological characteristics of the carbon black-(41%) silica composite aggregate containing rubber formulation.
Figure 16:
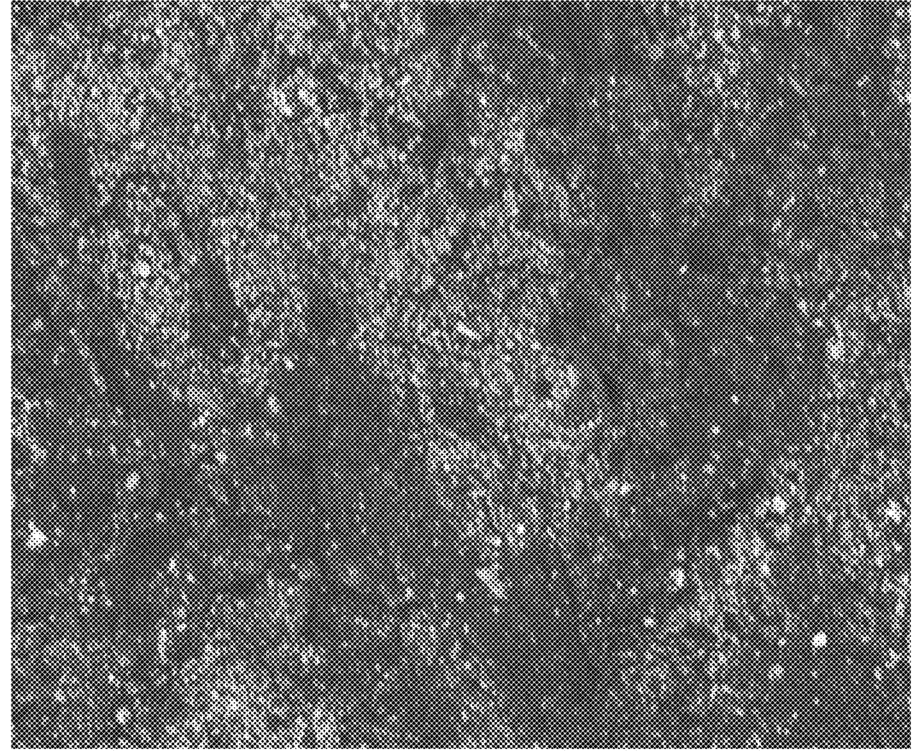
FIG. 16 shows FESEM morphological characteristics of the carbon black-(57%) silica composite aggregate containing rubber formulation.

Even though the post milling is not done for any sample, the surface appears to have more cleft matrix in the carbon black-(41%) silica composite aggregate containing sample (FIG. 15) as well as in the carbon black-(57%) silica composite aggregate containing sample (FIG. 16). The colour contrast in the micrograph of FIG. 15 does show presence of the crystalline silica particles but they are well distributed across the area under observation. This indicates that dispersion of the composite aggregate is better than that produced by the conventional mixing of the fillers with the rubber compound shown in FIG. 9.

Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language provided herein is intended merely to better illuminate the invention and does not pose a limitation on the scope of the invention unless otherwise claimed.

Preferred embodiments of this invention are described herein, including the best mode known to the inventors for carrying out the invention. Variations of those preferred embodiments will be apparent to those of ordinary skill in the art upon reading the foregoing description.

The invention claimed is:

1. A method for preparing a silica embedded carbon black composite aggregate comprising:

a) feeding an oxidative gas, silica precursor and carbon black feedstock to a mixing chamber of a reactor assembly;

b) mixing the oxidative gas, silica precursor and carbon black feedstock in the mixing chamber to obtain a pre-mixed blended feedstock;

c) injecting the pre-mixed blended feedstock into a flame burner of the reactor assembly, said flame burner being operably connected to the mixing chamber;

d) generating heat of combustion through partial oxidative burning of the pre-mixed blended feedstock to attain reactor thermal conditions; and e) cracking the pre-mixed blended feedstock to produce in-situ formed silica embedded carbon black composite aggregate, wherein weight percent of the embedded silica particle in the composite aggregate is in a range of from about 30% to about 60%, and wherein weight ratio of the silica-precursor to the carbon black feedstock in the step a) is from 0.12 to 0.259.

2. The method as claimed in claim 1, wherein the oxidative gas is selected from air, nitrogen-oxygen mixtures, pure oxygen and mixture thereof.

3. The method as claimed in claim 1, wherein the carbon black feedstock comprises a fuel having high content of hydrocarbon.

4. The method as claimed in claim 3, wherein the fuel having high content of hydrocarbon is selected from various sources such as petroleum or its derivatives, heavy hydrocarbon oils, recovered pyrolysis oils and mixtures thereof.

5. The method as claimed in claim 1, wherein the silica precursors are selected from organosilanes and organosilicates.

6. The method as claimed in claim 1, wherein weight ratio of the silica-precursor to the carbon black feedstock in the step a) is from 0.017 to 0.259.

7. The method as claimed in claim 1, further comprising collecting the silica embedded carbon black composite aggregate in a collector assembly.

8. The method as claimed in claim 7, further comprising filtering the silica embedded carbon black composite aggregate, said filtering being carried out by the collector assembly.

9. The method as claimed in claim 1, further comprising supplying an inert gas around the flame burner of the reactor assembly.

10. A silica embedded carbon black composite aggregate prepared by a method comprising:

a) feeding an oxidative gas, silica precursor and carbon black feedstock to a mixing chamber of a reactor assembly;

b) mixing the oxidative gas, silica precursor and carbon black feedstock in the mixing chamber to obtain a pre-mixed blended feedstock;

c) injecting the pre-mixed blended feedstock into a flame burner of the reactor assembly, said flame burner being operably connected to the mixing chamber;

d) generating heat of combustion through partial oxidative burning of the pre-mixed blended feedstock to attain reactor thermal conditions; and e) cracking the pre-mixed blended feedstock to produce in-situ formed silica embedded carbon black composite aggregate, wherein weight percent of the embedded silica particle in the composite aggregate is in a range of from about 30% to about 60%, and wherein weight ratio of the silica-precursor to the carbon black feedstock in the step a) is from 0.12 to 0.259.

11. The silica embedded carbon black composite aggregate as claimed in claim 10, wherein a BET surface area of the silica embedded carbon black composite aggregate is in a range of from about 20 m2/g to about 180 m2/g.

12. The silica embedded carbon black composite aggregate as claimed in claim 10, wherein the oxidative gas is selected from air, nitrogen-oxygen mixtures, pure oxygen and mixture thereof.

13. The silica embedded carbon black composite aggregate as claimed in claim 10, wherein the carbon black feedstock comprises a fuel having high content of hydrocarbon.

14. The silica embedded carbon black composite aggregate as claimed in claim 13, wherein the fuel having high content of hydrocarbon is selected from petroleum or its derivatives, heavy hydrocarbon oils, recovered pyrolysis oils and mixtures thereof.

15. The silica embedded carbon black composite aggregate as claimed in claim 10, wherein the silica precursors are selected from organosilanes and organosilicates.

16. The silica embedded carbon black composite aggregate as claimed in claim 10, further comprising collecting the silica embedded carbon black composite aggregate in a collector assembly.

17. The silica embedded carbon black composite aggregate as claimed in claim 16, further comprising filtering the silica embedded carbon black composite aggregate, said filtering being carried out by the collector assembly.

18. The silica embedded carbon black composite aggregate as claimed in claim 10, further comprising supplying an inert gas around the flame burner of the reactor assembly.

19. A rubber composition comprising the silica embedded carbon black composite aggregate as claimed in claim 10.

* * * * *